L. T. OUTHIER.
TROLLEY.
APPLICATION FILED JUNE 4, 1921.

1,407,353.

Patented Feb. 21, 1922.

Witness
James F. Fitz Gibbon

Inventor
Louis T. Outhier
By (signature)
Attorneys

UNITED STATES PATENT OFFICE.

LOUIS T. OUTHIER, OF EUREKA, CALIFORNIA.

TROLLEY.

1,407,353. Specification of Letters Patent. Patented Feb. 21, 1922.

Application filed June 4, 1921. Serial No. 475,056.

*To all whom it may concern:*

Be it known that I, LOUIS T. OUTHIER, a citizen of the United States, residing at Eureka, in the county of Humboldt, State of California, have invented certain new and useful Improvements in Trolleys; and I do hereby declare the following to be a full, clear, and exact description of the invention, such as will enable others skilled in the art to which it appertains to make and use the same.

This invention relates to new and useful improvements in trolleys and particularly to electric trolleys.

One object of the invention is to provide a novel and improved means for mounting the trolley wheel on the pole whereby the wheel will be kept in firm contact with the wire.

Another object is to provide a device of this character wherein the tension of the spring, in the trolley head, is capable of adjustment, in a novel and efficient manner.

Other objects and advantages will be apparent from the following description when taken in connection with the accompanying drawing.

Figure 1:
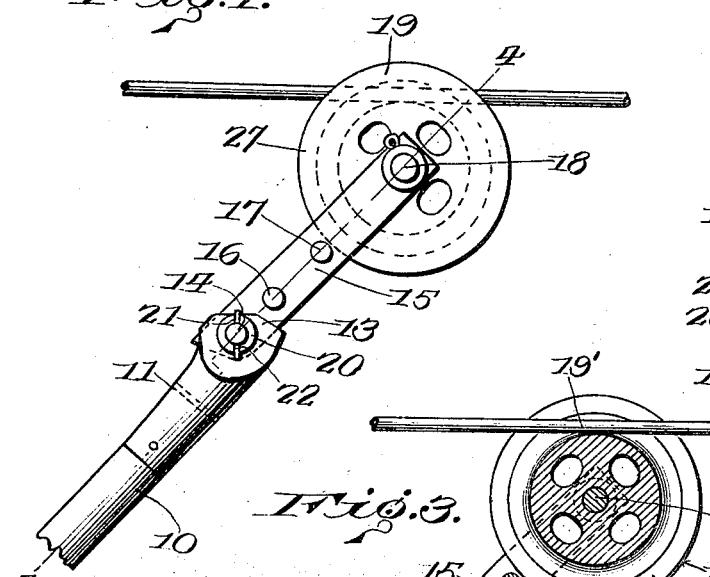
Figure 1 is a side elevation of a trolley made in accordance with the invention.

Referring particularly to the accompanying drawing, 10 represents a portion of a trolley pole on which is mounted the head 11, said head having a recess 12 therein, with the apertured vertical side walls 13. Disposed through the apertured walls 13 is a shaft 14, and mounted for rocking movement on this shaft is a frame including the vertical side members 15, connected by the transverse braces 16 and 17, and supporting in their upper ends the shaft 18 of the trolley wheel 19.

On the outer face of each side wall 13 is formed a boss 20, and formed in each boss are the radially extending notches or recesses 21. The ends of the shaft 14 project short distances beyond the side walls and disposed transversely through these ends of the shaft are the removable pins 22 and 23, respectively, for engagement in the recesses 21, for preventing rotation of the shaft.

Coiled around the shaft 14 is a spring 24, the outer ends of which are extended upwardly and secured to the adjacent brace 16, while the intermediate portion of the spring is formed with a loop 25 which is engaged with a pin 26, disposed through the center of the shaft.

The spring 24 normally exerts upward pressure on the frame 15—16—17, to hold the wheel firmly against the wire, so that should the trolley pole be suddenly thrown downwardly, the spring 24 will exert force to swing the frame upwardly and retain the wheel on the wire.

When the spring 24 becomes weakened, the pins 22 and 23 are removed and the shaft 14 rotated to draw the spring, or wind the same on the shaft. The pins are then restored through the ends of the shaft, and in the recesses of the bosses.

Figure 2:
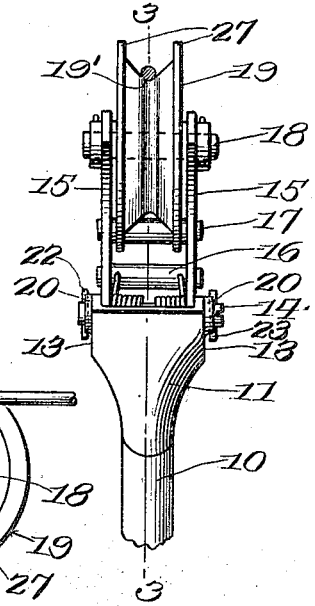
Figure 2 is a rear elevation of the same.
Figure 3:
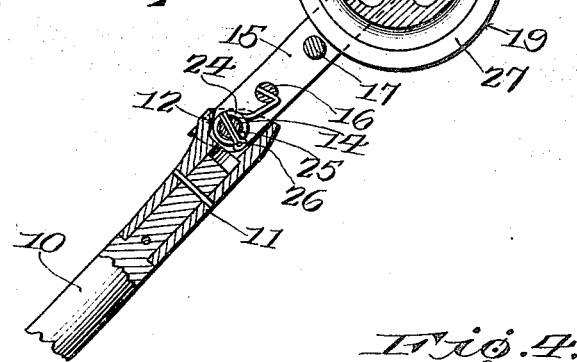
Figure 3 is a vertical longitudinal central sectional view taken on the line 3—3 of Fig. 2.
Figure 4:
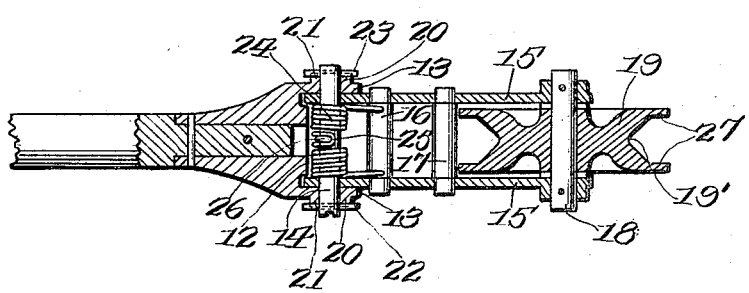
Figure 4 is a vertical longitudinal central sectional view on the line 4—4 of Figure 1.

It will be noted, upon reference to Figure 2, that the members 15 bear against the rear wall of the recess 12, when the trolley is normally engaged with the trolley wire, but that when the pole suddenly drops, the members 15 will be urged upwardly to retain the wheel in engagement with the wire. This latter position is clearly shown in dotted lines in Figure 1.

It will be noted that the wheel 19 has the wire receiving groove 19', in its center between the flanges 27, and that these flanges having the straight vertical inner faces, which join with the upper ends of the curved walls of the groove, so that the wheel will be more positively maintained on the wire.

What is claimed is:

A trolley device including a head having a socket therein, a shaft disposed transversely in the socket, a frame mounted for rocking movement on the shaft and supporting a trolley wheel, the frame including a transverse brace, a spring coiled about the shaft and having its ends secured to the said brace, the intermediate portion of the spring being secured to the shaft, the sides of the head having bosses surrounding the adjacent ends of the shaft and formed with radial recesses, and pins removably disposed through the ends of the shaft and in the recesses for retaining the spring under tension.

In testimony whereof, I affix my signature, in the presence of two witnesses.

LOUIS T. OUTHIER.

Witnesses:
H. W. OUTHIER,
J. H. DOLON.